(12) United States Patent
Janssen et al.

(10) Patent No.: US 6,384,817 B1
(45) Date of Patent: May 7, 2002

(54) APPARATUS FOR APPLYING VOLTAGES TO INDIVIDUAL COLUMNS OF PIXELS IN A COLOR ELECTRO-OPTIC DISPLAY DEVICE

(75) Inventors: Peter J. Janssen, Scarborough; Lucian Remus Albu, New York City; John E. Dean, Stormville, all of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/469,455

(22) Filed: Dec. 21, 1999

(51) Int. Cl.[7] .............................. G09G 5/00; G09G 3/36
(52) U.S. Cl. .................... 345/204; 345/98; 345/208; 345/690; 345/214
(58) Field of Search ........................... 345/204, 87, 90, 345/98, 100, 94, 690, 208, 211, 214

(56) References Cited

U.S. PATENT DOCUMENTS

| | | | |
|---|---|---|---|
| 5,189,406 A | | 2/1993 | Humphries et al. ......... 340/793 |
| 5,352,937 A | * | 10/1994 | Dingwall .................... 307/355 |
| 5,623,279 A | * | 4/1997 | Itakura et al. ................ 345/98 |
| 5,721,563 A | * | 2/1998 | Memida ....................... 345/98 |
| 5,731,795 A | * | 3/1998 | Kanda et al. ................. 345/94 |
| 5,874,934 A | * | 2/1999 | Ito ............................... 345/98 |
| 6,049,321 A | * | 4/2000 | Sasaki .......................... 345/99 |
| 6,160,534 A | * | 12/2000 | Katakura ..................... 345/98 |
| 6,249,269 B1 | * | 6/2001 | Blalock et al. ............... 345/97 |

* cited by examiner

*Primary Examiner*—Bipin Shalwala
*Assistant Examiner*—Jimmy H. Nguyen

(57) ABSTRACT

In an electro-optic display device, such as a liquid crystal display device which serves as a modulator for projected light, a global ramp generator is used in conjunction with track and hold circuits to convert incoming digital display signals to analog signals, and to address the individual pixels of the display device with such analog signals. A plurality of column drivers, each coupled to the ramp generator and to the pixels in a column of the display device, track and hold the ramp voltage signal when it reaches a value corresponding to the desired brightness level of a particular pixel in the respective column. At least one current source is provided, coupled to the signal source output, for supplying current to the signal source output, as needed, to compensate for switching the capacitive load of the column drivers on and off. As a result, transient voltages in the ramp signal are avoided.

6 Claims, 3 Drawing Sheets

APPARATUS FOR APPLYING VOLTAGES TO INDIVIDUAL COLUMNS OF PIXELS IN A COLOR ELECTRO-OPTIC DISPLAY DEVICE

CROSS-REFERENCE TO RELATED APPLICATION

The subject matter of this application is related to that disclosed in the commonly assigned U.S. patent application Ser. No. 09/375,952, filed Aug. 17, 1999 entitled "DAC DRIVER CIRCUIT WITH PIXEL RESETTING MEANS AND COLOR ELECTRO-OPTIC DISPLAY DEVICE AND SYSTEM INCORPORATING SAME".

BACKGROUND OF THE INVENTION

The invention relates to color display systems which employ one or more electro-optic display devices. Such a display device serves as a light modulator, either in the reflective or transmissive mode, to control the grey level of projected light at each pixel point. More particularly, the invention relates to digital to analog (DAC) driver circuitry employed in such a color display system to convert incoming digital display signals to analog signals, and to address the individual pixels of the display device with such analog signals.

Color display systems are known in which light bars of different colors are sequentially scrolled across a single electro-optic light modulator panel to produce a color display. See, for example, commonly assigned U.S. Pat. No. 5,532,763, incorporated herein by reference. These display systems are particularly suitable for displaying color information in the form of continuously updated image information signals arranged in successive frames, such as color video information, in which each frame is composed of component color sub-frames, e.g., red, green and blue sub-frames.

These systems employ an electro-optic light modulator panel comprised of a row-and-column matrix array of pixels, for modulating light in accordance with the image information signals during successive frame periods. The analog signal information is applied to the pixel columns of the array, a row at a time, during each frame period.

A system of this type is also disclosed in the publication of J.A. Shimizu, "Single Panel Reflective LCD Projector", *Projection Displays V*, Proceedings SPIE, Vol. 3634, pp. 197–206 (1999). In such a system, a plurality of column pixel driver circuits receive a common ramp signal which is repeatedly generated, during a plurality of cycles, by the output buffer of a digital-to-analog converter (DAC). Each column driver is coupled to all the pixels in a column of the electro-optic display device. During each ramp cycle, the column driver applies a prescribed voltage, corresponding to a desired pixel brightness level, to a pixel in a particular row in the respective column. The pixels in a column are selected by a row control circuit which selects successive pixel rows during successive ramp cycles.

Each of the column drivers, which receive the common ramp voltage from the DAC ramp generator, includes a track and hold circuit for storing the voltage signal when it reaches the value corresponding to the desired brightness level of a respective pixel. Since the voltage is sampled and stored on a capacitor in each driver, all the column drivers together represent a relatively high capacitive load to the ramp generator. When column sampling switches in the column drivers open or close, the transient load, in conjunction with the intrinsic output impedance and finite bandwidth of the output buffer amplifier of the ramp generator, can give rise to a voltage transient. A worst case condition occurs when a large number of column driver switches open simultaneously to sample a particular grey level (e.g., a background level) for the pixels in a particular row. In this case, the pixels in the same row, which are sampled immediately after this simultaneous sampling event (that is, at the next higher or lower grey level) will normally see the largest transient. In cases where the transient amplitude of the ramp signal is greater than the least significant bit (LSB) value, a visible artifact will be produced in the displayed image.

The voltage transients referred to above tend to increase as the resolution of the display is increased, since the switched capacitive load on the DAC ramp generator increases with an increasing number of column drivers. Also, as the display resolution (the numbers of columns and rows) increases, the switching frequency must increase to maintain the same frame rate. A higher switching frequency necessitates a lower DAC cycle time (the cycle period) resulting in even sharper transients. Higher frame rates, necessary to reduce flicker and color artifacts, call for a still further increase in switching frequency.

SUMMARY OF THE INVENTION

It is a principal object of the present invention to provide a color display system, having an analog electro-optic light modulator with a matrix of pixels, which employs a global ramp signal generator and individual track and hold column driver circuits for each column of the light modulator, and which reduces or eliminates voltage transients caused by switching capacitive loads.

This object, as well as other objects which will become apparent from the discussion that follows, are achieved, in accordance with the present invention, by providing a compensation mechanism which enables a continuous current to be drawn from the ramp generator, and in particular the buffer amplifier of the ramp generator, independent of the current drawn by one or more of the column drivers.

More specifically, the present invention relates to a particular device for applying various levels of voltage to individual columns of pixels in an electro-optic display having a matrix of pixels, arranged vertically in columns and horizontally in rows. This device includes:

(a) a signal source having an output, the signal source producing at this output a monotonically varying voltage signal (e.g., a ramp signal) and repeating this voltage signal during a plurality of successive periods or cycles;

(b) a plurality of column drivers, each coupled to the signal source output and to the pixels in a column of the display, each column driver including a track and hold circuit for storing the voltage signal when it reaches a value corresponding to a desired brightness level of a particular pixel in the respective column during a given cycle, each column driver drawing current from the signal source during a portion of the cycle when the voltage signal is present; and (c) at least one current source coupled to the signal source output for supplying current to the signal source output, during a portion of the cycle when said voltage signal is present, which is approximately equal in magnitude to the current drawn by one or more the column drivers.

This device according to the invention insures that the current drawn from the signal source (ramp generator) remains approximately constant, during the portion of each cycle when the ramp voltage signal is present, independent of the current drawn by one or more of the column drivers.

The present invention, is based on the recognition that the voltage transients appearing at the output of the ramp buffer amplifier are not directly caused by a change in the capacitive load, but by changes in the ramp buffer amplifier's output current. This problem is solved by the compensation device described above, which enables a continuous current to be drawn from the ramp buffer amplifier. Preventing a change in the amplifier output current thus prevents a transient from occurring and allows a smooth, monotonic ramp to be generated, in spite of the sampling thereof by the column drivers.

The compensating device for maintaining constant the current drawn from the signal source (ramp generator, or more particularly the ramp buffer amplifier) may be implemented in a number of different ways.

According to a first preferred embodiment of the present invention, a plurality of current sources are provided, each associated with a separate one of the column drivers. In this case, each current source is operative to compensate for current drawn by its associated column driver.

Compensation may be achieved in one embodiment wherein the current drawn by each current source is made approximately equal to but opposite in sign to the current drawn by the associated column driver, and is drawn during the same portion of each cycle, as when the current is drawn by the associated column driver. In another embodiment, the current drawn by each current source is made approximately equal to and equal in sign to the current drawn by the associated column driver, and is drawn during a portion of each cycle, when current is not drawn by the associated column driver.

In still another preferred embodiment of the present invention, a single adjustable current source is provided to compensate for a varying current drawn by the plurality of column drivers. In this case, the current source is controlled, to adjust the amount of current generated by the source, by means of a control circuit which selects the amount of current produced by the current source in dependence upon the number of column drivers which apply a capacitive load to the ramp generator.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
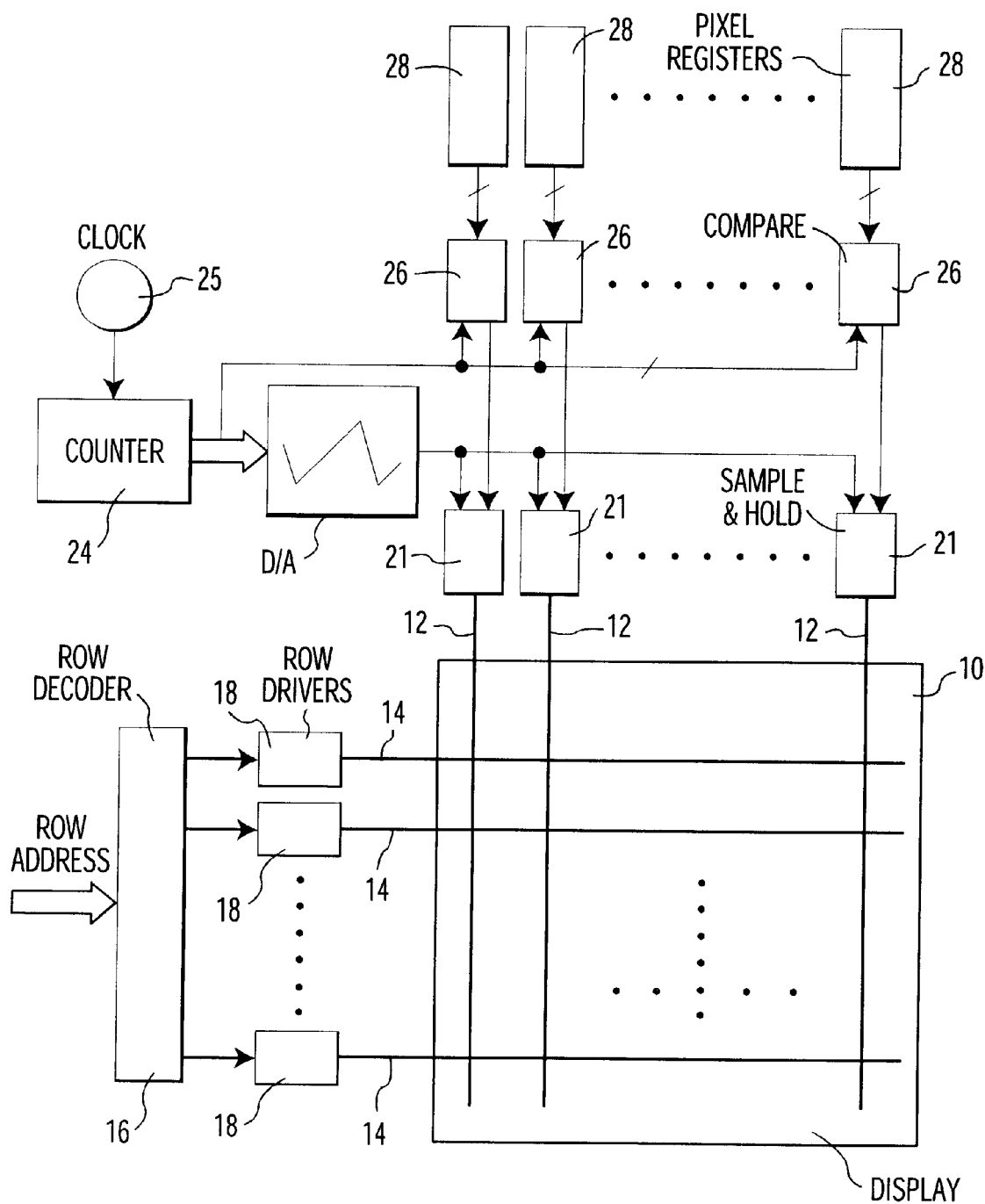
FIG. 1 is a block diagram of an analog electro-optic light modulator panel, and its associated driver circuits, of the type to which the present invention relates.

The preferred embodiments of the present invention will now be described with reference to FIGS. 1–6 of the drawings. Identical elements in the various figures are designated with the same reference numerals.

FIG. 1 illustrates a typical arrangement for controlling and driving an electro-optic display device. In this arrangement, a liquid crystal display or light modulator 10 has a matrix of pixels arranged vertically in columns and horizontally in rows. These pixels are located vat the intersections of the column conductors 12 and the row conductors 14. The column conductors 12 provide analog voltages to the pixels in each column whereas the row conductors 14 provide a switching voltage to each associated row, permitting the column voltages to be supplied to the pixels of that row.

Rows are successively addressed in a prescribed order by means of a row decoder 16 which activates successive ones of the row drivers 18.

Column voltages are supplied by column driver circuits which are realized as track and hold circuits. These track and hold circuits receive a ramp voltage from the output buffer amplifier of a digital-to-analog converter (DAC), 22. The DAC 22 receives successive digital numbers from a counter 24 that counts pulses produced by a clock 25. The count commences either from some minimum number or maximum number and increases or decreases steadily until it reaches, at the opposite end of the scale, a maximum or minimum number, respectively. The DAC thus produces an increasing or decreasing ramp signal, in repetitive cycles, which approximates its digital input.

The output of the counter 24 is also supplied to a number of comparators 26, one for each column. This number is then compared in each comparator to a digital number representing the desired brightness level of a pixel in the associated column. The number representing this brightness level is stored in an associated pixel register 28 during each complete cycle of the system.

When the count supplied by the counter 24 is equal to the digital number stored in a pixel register, the respective comparator 26 produces a pulse which is passed to the track and hold circuit 20 for that column. Upon receiving such an enable pulse, the associated column driver 20 stores a voltage equal to the instantaneous output of the ramp generator 22.

Upon completion of each ramp cycle, the voltages stored in the column driver circuits are supplied to a pixel in a particular row selected by the row drivers 18.

A condition for superior performance in this system is the generation of an absolutely clean ramp signal. The column driver circuits in this system represent a high capacitive load to the ramp generator. When column sampling switches open or close, the transient load, in conjunction with the intrinsic output impedance and finite bandwidth of the ramp buffer amplifier, can give rise to a voltage transient. A worst case condition occurs when almost all column switches open simultaneously. The column driver which samples and holds the ramp voltage immediately after thate event (representing the next grey level in the display) will see the largest transient. If the transient amplitude is greater than the least significant bit (LSD) value, a visible artifact will be produced by the display.

Consequently, the advantages of the simple ramp-DAC are compromised by the following factors:

(1) As the capacitive load being switched in the column drivers increases (that is, as the display resolution increased) the transient will also increase.

(2) As the display resolution (the numbers of columns and rows) increases, the switching frequency must also increase. Such an increase in switching frequency also increases the transient.

(3) Higher frame rates, necessary to reduce flicker and color artifacts, call for a still further increase in switching frequency.

The present invention is based on the recognition that the transient response of the buffer amplifier of the ramp/DAC circuit is not directly caused by the change in the capacitive load, but is induced primarily by a change in the amplifier output current. Preventing a change in the amplifier output current prevents a transient from occurring. Thus, a smooth, monotonic ramp can be produced in spite of the sampling.

Figure 2:
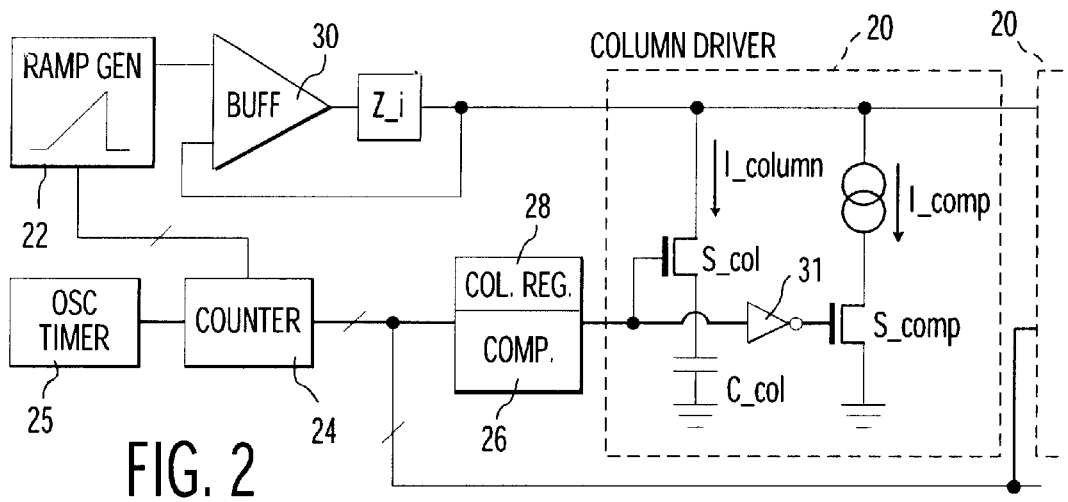
FIG. 2 is a block diagram of a first preferred embodiment of the present invention.

FIG. 2 illustrates the operation of a compensation scheme that provides a continuous current load to the ramp buffer amplifier. In this transient free system, all column drivers (only one is shown) share the buffered output of the common ramp generator 22. The low intrinsic output impedance $Z_i$ of the buffer output stage 30 is further reduced by feedback. The DAC needs the buffer amplifier 30 to isolate the ramp waveform from the load and other disturbances. The buffer amplifier has a very low internal impedance, but it is not perfect. Sudden disturbances result in transients so it needs compensation.

While the transistor switch $S_{col}$ is on, the ramp signal is tracked by the column capacitor $C_{col}$ and a charging current $I_{column}$ is supplied by the buffer amplifier 30. When the output of the counter 24 equals the data stored in the associated column register 28, the comparator circuit 26 turns the column switch $S_{col}$ off and the current $I_{column}$ goes to zero. Concurrently, the switch $S_{comp}$, driven through an inverter amplifier 31, turns the current source $I_{comp}$ on. Provided $I_{comp}$ equals $I_{column}$ the buffer output current remains continuous and no transient is induced.

Figure 3:
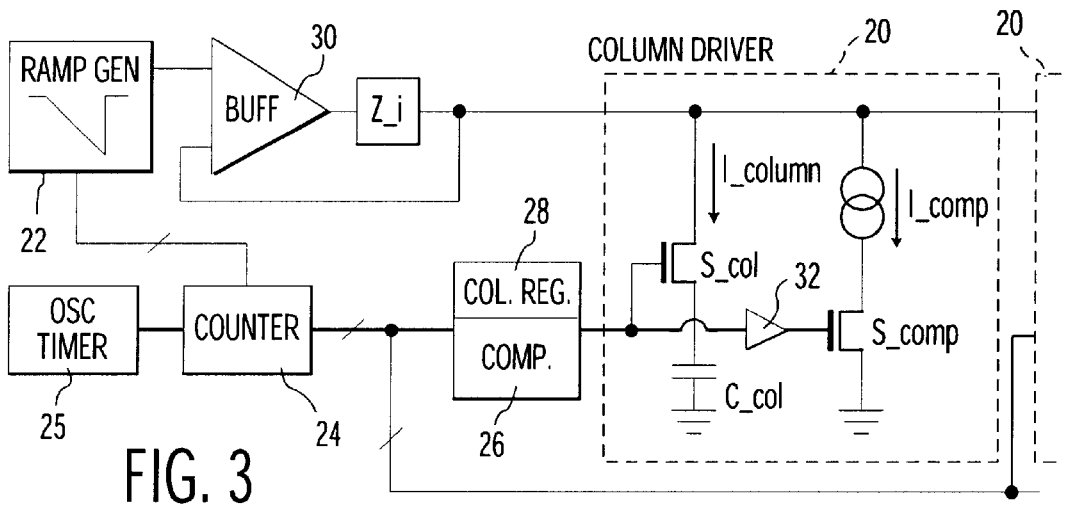
FIG. 3 is a block diagram of a second preferred embodiment of the present invention.

FIG. 3 shows a system, similar to that of FIG. 2, modified to cancel transients in a negative going ramp. In this embodiment, the charging current $I_{column}$ is equal and opposite to the compensating current $I_{comp}$. Unlike the circuit of FIG. 2, wherein the compensating current is switched on when the charging current $I_{column}$ is switched off, both the capacitive load and current source are switched off at the sampling moment. Instead of an inverting amplifier 31 as in FIG. 2, the polarity of the output of the amplifier (AND gate)32 is the same as that of the input.

Figure 4:
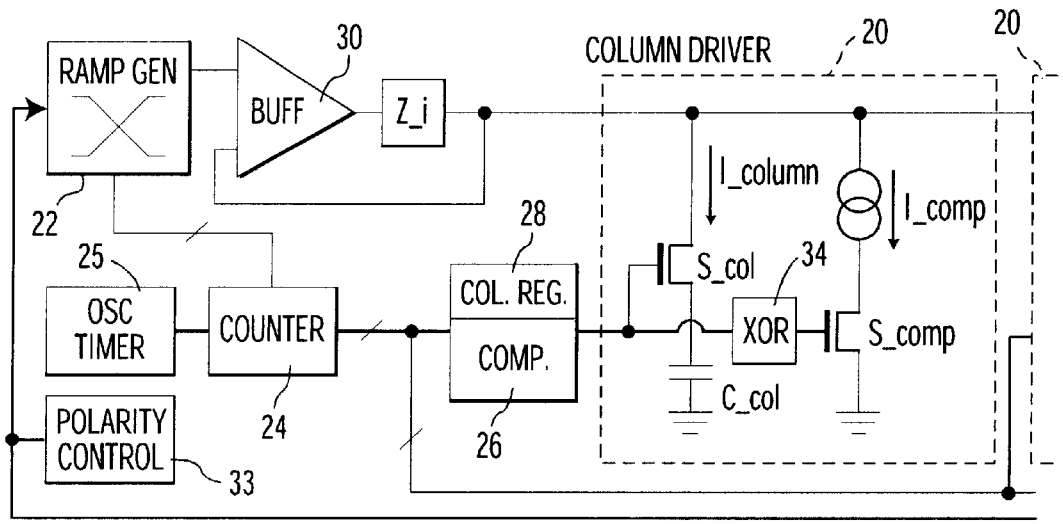
FIG. 4 is a block diagram of a third preferred embodiment of the present invention.

The compensation circuit shown in the system of FIG. 4 contains the features of both FIG. 2 and FIG. 3. In this case, a polarity control 33 is used to select the ramp polarity of the ramp generator 22 and also the inversion option of an exclusive OR (XOR) stage 34.

Figure 5:
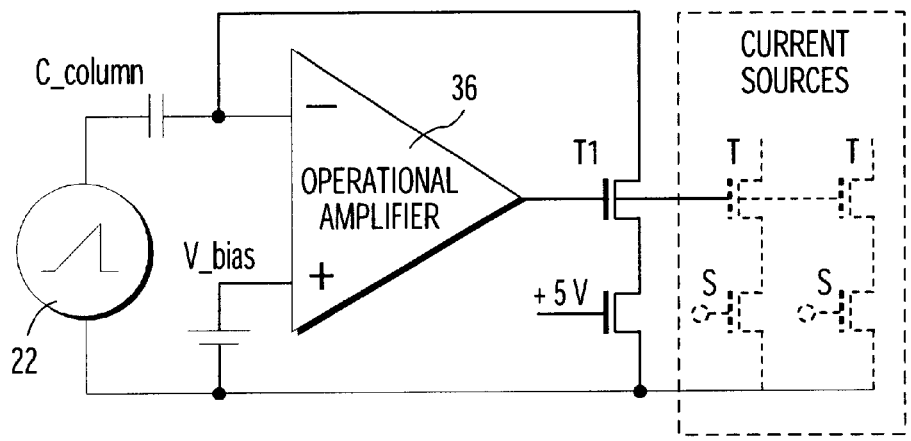
FIG. 5 is a block diagram of a fourth preferred embodiment of the present invention.

FIG. 5 shows a current source control circuit in greater detail. The inverting input of the operational amplifier 36 serves as a virtual ground connection for the capacitor $C_{column}$. The transistor T1 provides the charging current for the capacitor $C_{column}$. $C_{column}$ is identical in value to the column capacitors $C_{col}$, in the column driver 20. The transistor T1 is identical to the transistors T in the current sources. The transistors S serve as switches which activate the current sources.

Figure 6:
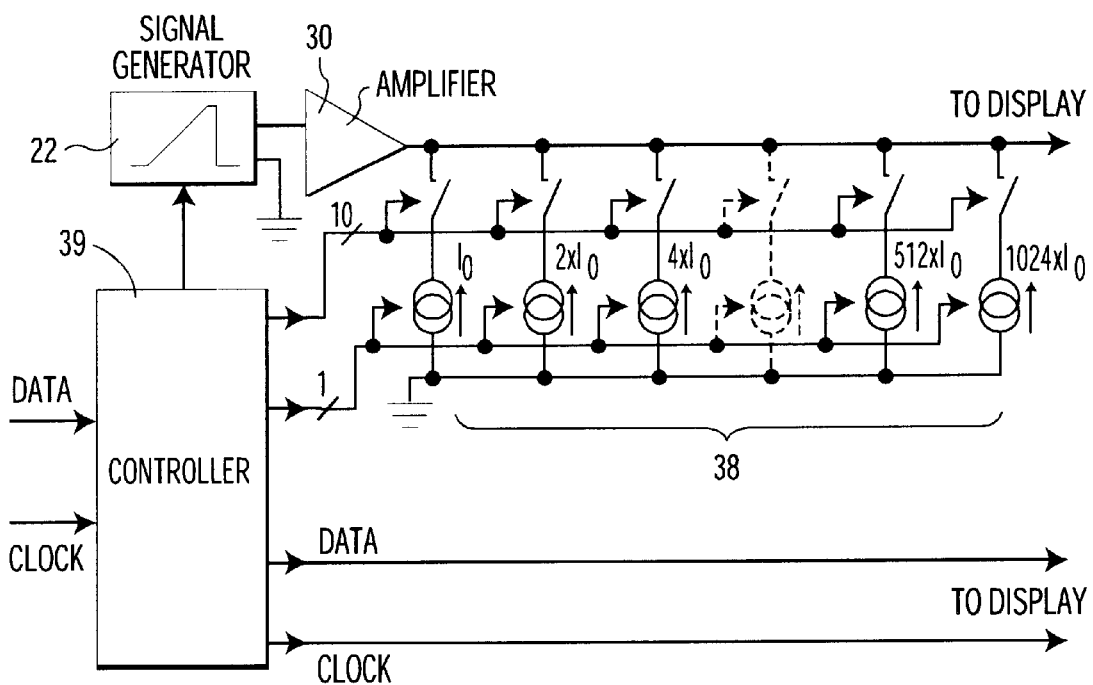
FIG. 6 is a block diagram of a fifth preferred embodiment of the present invention.

FIG. 6 shows yet another embodiment of the invention wherein a single set of current sources 38 are used to compensate the current supplied to all the column drivers. In this case the individual current sources, which are switchable by a controller 39, supply different levels of current: multiples of a basic current $I_o$; that is, $I_0$, $2 \times I_0$, $4 \times I_0$ ... $512 \times I_0$ and $1024 \times I_0$. The precise amount of compensating current can therefore be supplied to the output of the buffer amplifier 30 by switching on combinations of the current sources 38.

The controller 39 receives both the pixel data and clock pulses and determines when the individual column drivers will sample the ramp signal from the output of the buffer amplifier 30. With this information the controller 39 can determine the amount and timing of current to be injected by the current sources 38.

There has thus been shown and described a novel apparatus for applying voltages to individual columns of pixels in a color electro-optic display device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for applying various levels of voltage to individual columns of pixels in a display device having a matrix of pixels arranged vertically in columns and horizontally in rows, said apparatus comprising:
   (a) a signal source having an output, said signal source producing at said output a monotonically varying voltage signal and repeating said voltage signal during a plurality of cycles; and
   (b) a plurality of column drivers, each coupled to said signal source output and to the pixels in a column of said display device, each column driver including a track and hold circuit for storing the voltage signal when it reaches a value corresponding to a desired brightness level of a particular pixel in the respective column during a given cycle, each said column driver drawing current from said signal source during a portion of said cycle when said voltage signal is present; and
   (c) at least one current source coupled to said signal source output for supplying current to said signal source output, during a portion of said cycle when said voltage signal is present, which is approximately equal in magnitude to the current drawn by one or more said column drivers;
      whereby the current drawn from said signal source remains approximately constant, during the portion of each cycle, when said voltage signal is present, independent of the current drawn by one or more of said column drivers.

2. The apparatus defined in claim 1, wherein each of a plurality of current sources is associated with a separate one of said column drivers, each said current source being operative to compensate for current drawn by its associated column driver.

3. The apparatus defined in claim 2, wherein the current drawn by each current source is approximately equal to and opposite in sign to the current drawn by said associated column driver, and is drawn during the same portion of each cycle as when current is drawn by said associated column driver.

4. The apparatus defined in claim 2, wherein the current drawn by each current source is approximately equal to and equal in sign to the current drawn by said associated column driver, and is drawn during a portion of each cycle when current is not drawn by said associated column driver.

5. The apparatus defined in claim 1, wherein said current source comprises an adjustable current source having control circuit for adjusting the amount of current supplied to said signal source output during a each cycle.

6. The apparatus defined in claim 1, wherein each column driver further includes a digital register for storing a digital number representing said brightness level of a pixel and comparator means causing said sample and hold circuit to sample said voltage signal when it reaches a value corresponding to said digital number.

* * * * *